US005760965A

United States Patent [19]

Kim

[11] Patent Number: 5,760,965

[45] Date of Patent: Jun. 2, 1998

[54] WIDE-PROJECTION ANGLE LIQUID CRYSTAL PROJECTION LENS SYSTEM

[75] Inventor: Dong-Ha Kim, Suwon, Rep. of Korea

[73] Assignee: Samsung Electronics Co., Ltd., Kyungki-do, Rep. of Korea

[21] Appl. No.: 747,893

[22] Filed: Nov. 13, 1996

[30] Foreign Application Priority Data

Jan. 24, 1996 [KR] Rep. of Korea ........................ 96-01858

[51] Int. Cl.[6] ........................................ G02B 3/00

[52] U.S. Cl. ........................................ 359/651; 359/649

[58] Field of Search ........................................ 359/649, 650, 359/651, 735; 348/744, 756, 779, 781

[56] References Cited

U.S. PATENT DOCUMENTS

| | | | |
|---|---|---|---|
| 4,526,442 | 7/1985 | Betensky | 359/651 |
| 4,620,773 | 11/1986 | Fukuda | 359/650 |
| 4,810,075 | 3/1989 | Fukuda | 359/650 |
| 4,948,237 | 8/1990 | Hirata et al. | 359/649 |
| 5,005,950 | 4/1991 | Morin | 349/5 |
| 5,570,140 | 10/1996 | Toide et al. | 348/744 |

*Primary Examiner*—Georgia Y. Epps
*Assistant Examiner*—Ricky Mack
*Attorney, Agent, or Firm*—Burns, Doane, Swecker & Mathis, LLP

[57] ABSTRACT

A wide-projection angle liquid crystal projection lens system including a condensing lens, installed opposite to a light-emitting surface of an image-forming element for emitting image rays to be magnified and projected onto a screen of a projection display system, for converging the image rays incident thereto, a first lens group, installed opposite to a light-emitting surface of the condensing lens, for compensating for chromatic aberration of the image rays converged and emitted from the condensing lens, a second lens group for changing a direction of the image rays emitted from the first lens group, and a third lens group for magnifying the image rays emitted from the second lens group and projecting the magnified image rays to a reflecting mirror. According to the system, the optical axis of the system can be changed over about 90° utilizing the prism provided in the projection lenses, and thus the height and depth of the projection display system is reduced to a minimum. Also, utilizing the condensing lens provided opposite to the light-emitting surface of the image-forming element, only the image rays emitted from the liquid crystal display panel at nearly light angles pass through the projection lens system, and thereby the contrast of the image is improved.

13 Claims, 5 Drawing Sheets

WIDE-PROJECTION ANGLE LIQUID CRYSTAL PROJECTION LENS SYSTEM

BACKGROUND OF THE INVENTION

1. Field of the Invention

The present invention relates to a projection lens system with a wide-projection angle of view, and more particularly to a projection lens system which magnifies and projects an image provided from an image display panel onto a screen of a liquid crystal projection display device.

2. Description of the Prior Art

A conventional projection lens system, as shown in FIGS. 1 and 2, which is used in a wide viewing angle liquid crystal display device 1, has the shape of a rectangle, and is arranged in line between a liquid crystal panel 3 and a screen 5. The projection lens system 2 magnifies and projects an image incident from the liquid crystal panel 3 onto the screen 5 via a reflecting mirror 4.

The conventional rear type liquid crystal projection display device 1 as described above uses the cylindrical projection lens system 2, and this causes the height H and the depth D of the display device to be great large in comparison with the size of the screen 5, thereby occupying a large amount of space, and causing inconvenience in the installation and movement of the display device.

Further, according to the conventional lens system 2, the angle between an optical axis for the image incident from the liquid crystal panel 3 to the projection lens system 2 and an optical axis for the projection lens system 2 becomes larger near the edge region of the liquid crystal panel 3, and thus the surface reflection ratio of the image on the lens, which is incident from the edge region of the liquid crystal panel 3 to the projection lens system 2, becomes greater, resulting in that the quantity of light incident from the edge region of the liquid crystal panel 3 to the projection lens system 2 decreases, and the image corresponding to the edge region gets dim, deteriorating the contrast of the displayed image.

SUMMARY OF THE INVENTION

It is an object of the present invention to solve the problems involved in the prior art, and to provide a wide-projection angle liquid crystal projection lens system which can minimize the height and depth of a projection display device and obtain an image having a good contrast utilizing a prism and a condensing lens.

In order to achieve the above object, the present invention provides a wide-projection angle liquid crystal projection lens system comprising: a condensing lens, installed opposite to a light-emitting surface of an image-forming element for emitting image rays to be magnified and projected onto a screen of a projection display system, for converging said image rays incident into an aperture stop of said projection lens system; a first lens group, installed opposite to a light-emitting surface of said condensing lens, for correcting chromatic aberration of said image rays converged and emitted from said condensing lens; a second lens group for changing a direction of said image rays emitted from said first lens group; and a third lens group for magnifying said image rays emitted from said second lens group and projecting said magnified image rays to a reflecting mirror.

According to the present invention, in constructing the wide-projection angle projection lens system of magnifying and projecting an image produced from the image-forming element onto the screen of the rear type projection display system, the optical axis of the system can be changed over about 90° utilizing a prism provided in the projection lenses, and thus the height and depth of the projection display system can be reduced to a minimum. Also, utilizing the condensing lens provided opposite to the light-emitting surface of the image-forming element, only the image rays emitted from the liquid crystal display panel at nearly right angles pass through the projection lens system, and thereby the contrast of the image can be improved.

BRIEF DESCRIPTION OF THE DRAWINGS

The above object, other features and advantages of the present invention will become more apparent by describing the preferred embodiment thereof with reference to the accompanying drawings, in which:

Figure 2:
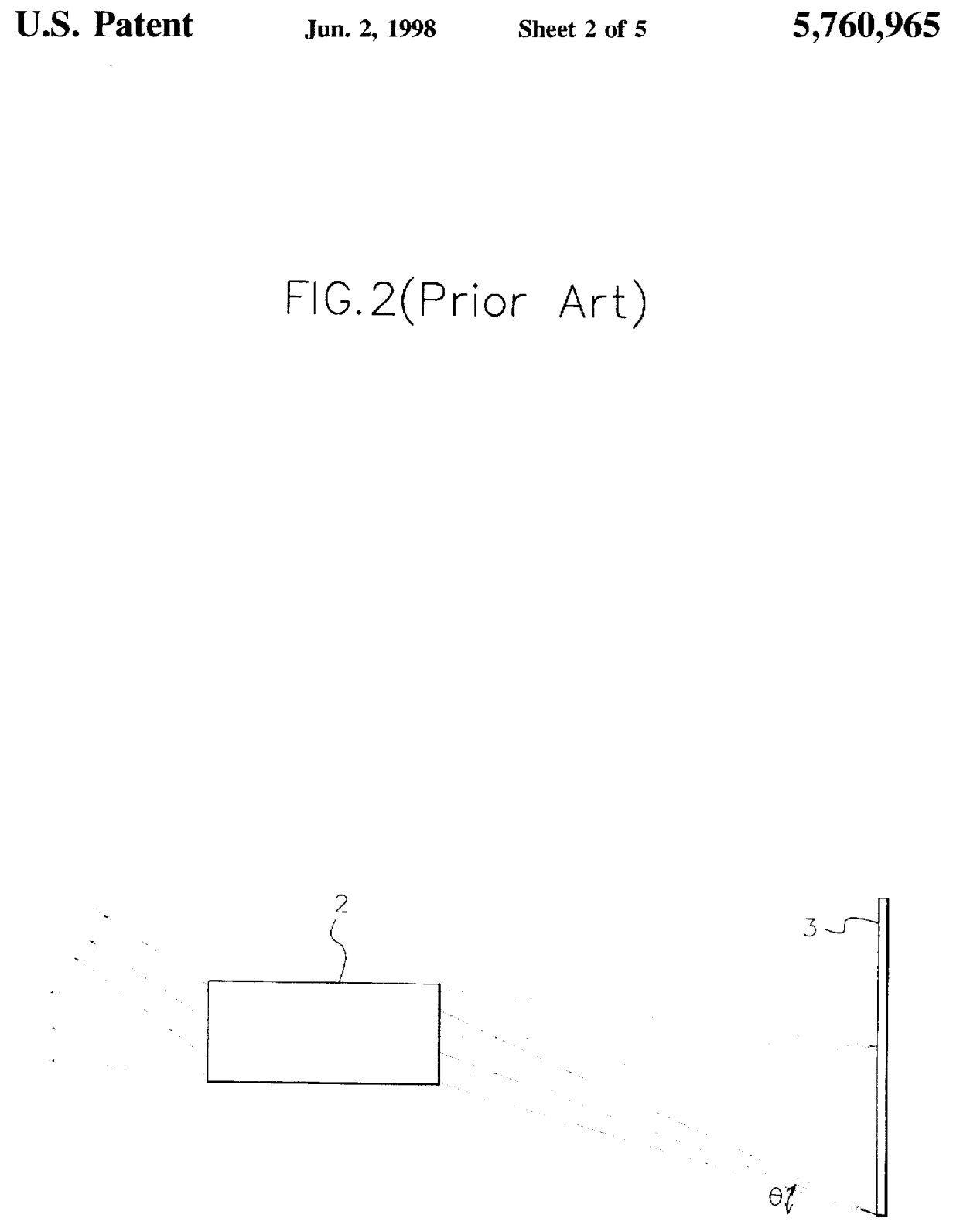

FIG. 2 is a view explaining the projection operation of the projection lenses used in the system of FIG. 1;

DETAILED DESCRIPTION OF PREFERRED EMBODIMENTS

Figure 1:
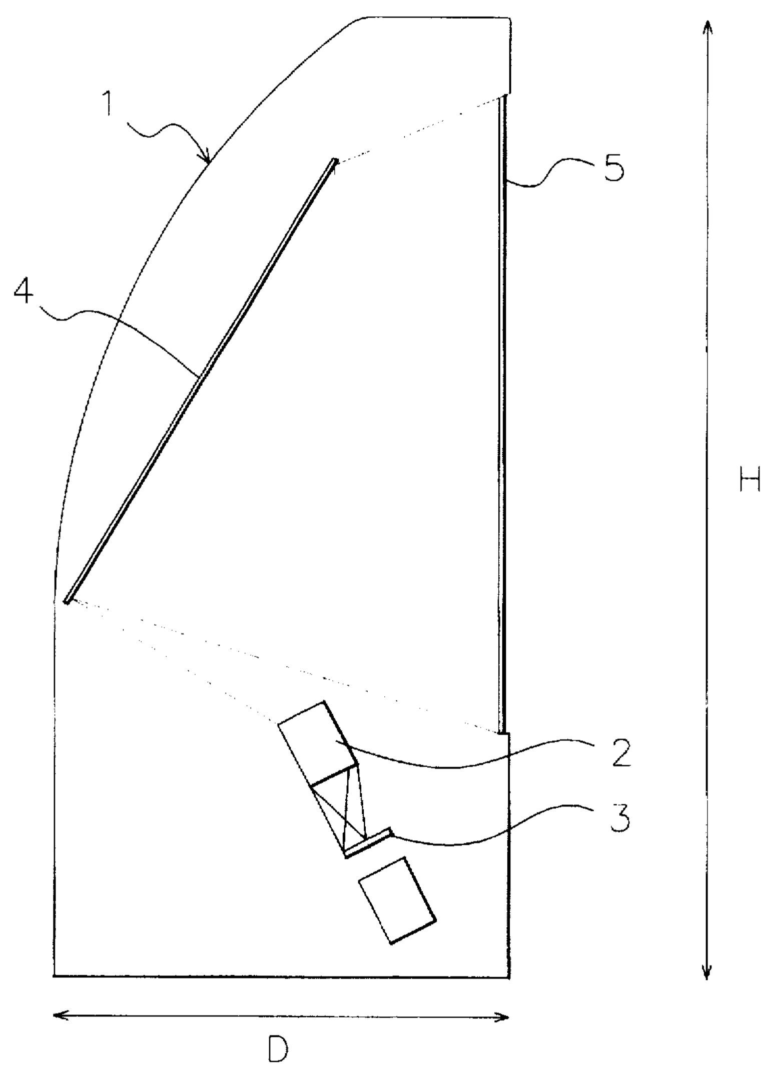
FIG. 1 is a sectional view illustrating the structure of a conventional projection display system.
Figure 3:
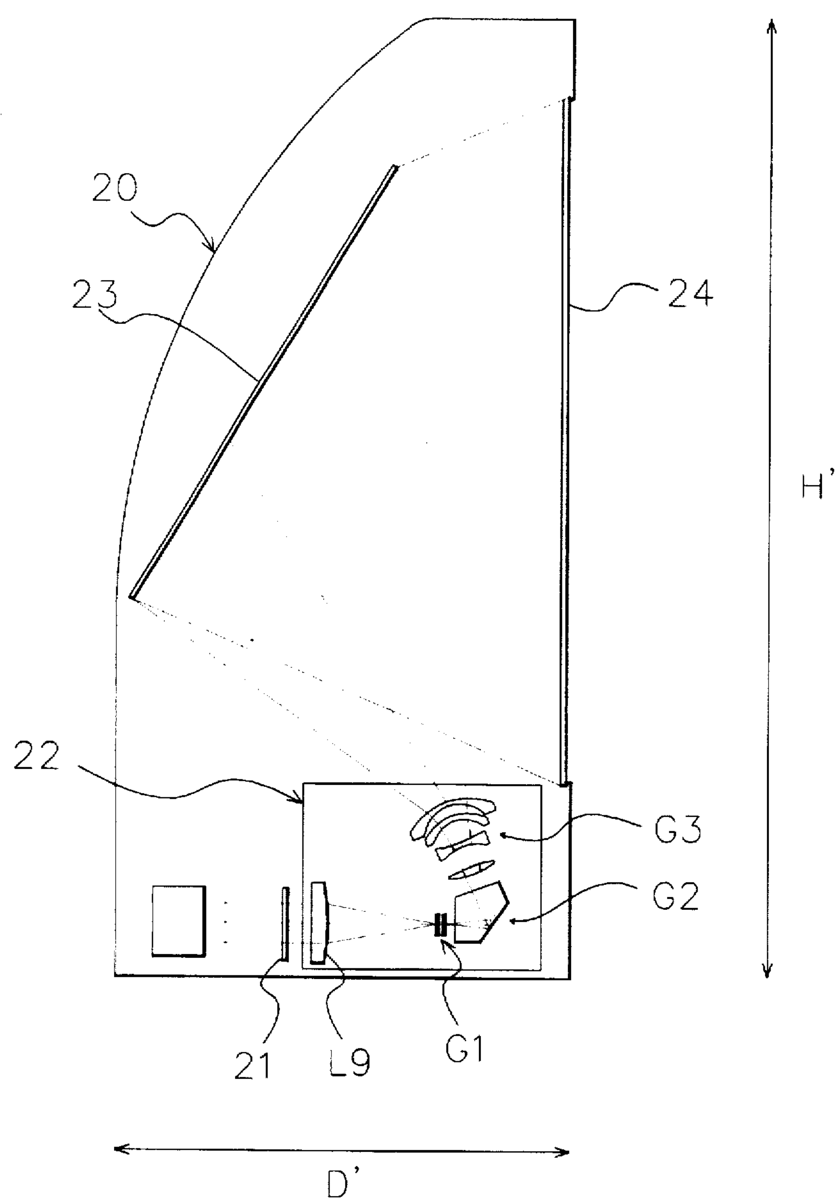
FIG. 3 is a sectional view illustrating the structure of the liquid crystal projection display system according to the present invention.
Figure 4:
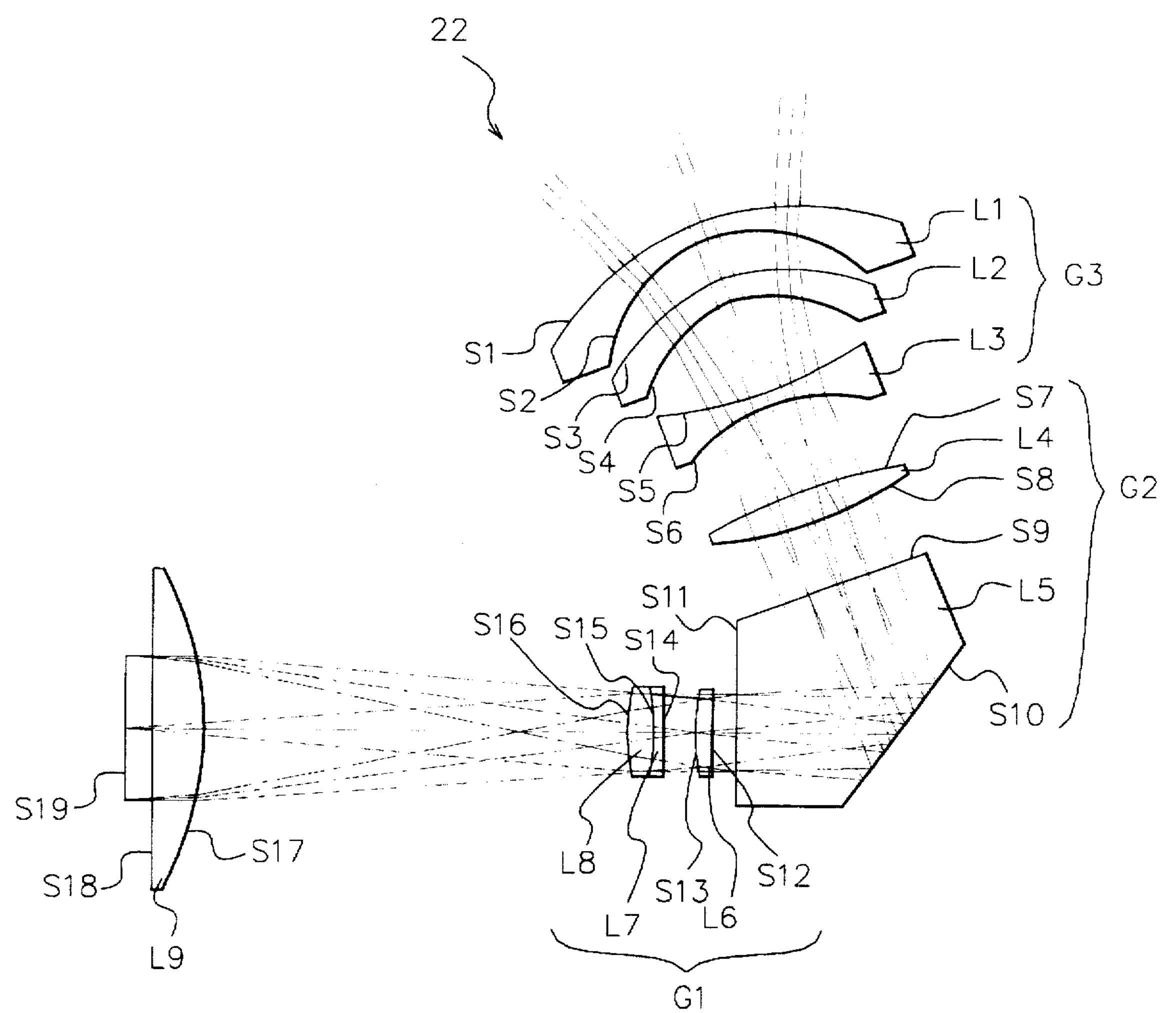
FIG. 4 is a view illustrating the arrangement of the projection lenses used in the liquid crystal projection display system according to one embodiment of the present invention.

Referring to FIG. 3, the liquid crystal projection display apparatus 20 employing the wide-projection angle liquid crystal projection lens system is structured so that image rays emitted from an image-forming element 21 composed of a liquid crystal display (LCD) panel or photodiode LCD (PDLCD) panel are magnified and projected by the projection lens system 22, reflected by a reflecting mirror 23, and then displayed on a screen 24.

The projection lens system 22 in the liquid crystal projection display apparatus 20 includes a condensing lens L9 for converting the image rays emitted from the image-forming element 21, a first lens group GI for correcting chromatic aberration of the image rays incident from the condensing lens L9, a second lens group G2 for changing the direction of the image rays incident from the first lens group GI, and a third lens group G3 for magnifying the image rays incident from the second lens group G2 and projecting the magnified image rays to the reflecting mirror 23.

The focal length of the condensing lens L9 is determined to be greater than the distance between the first lens group G1 and the condensing lens L9. The condensing lens L9 has a high dispersion and a low refractive index. The degree of parallelism of the optical axis which is effected by the condensing lens L9 is in the allowable error range of ±5°, and thus a brighter picture having a high contrast can be obtained.

The first lens group G1 is composed of at least one achromatic lens and projection lens L6. The achromatic lens has a weak positive optical power and comprises a convex lens L8 having a high dispersion and a low refractive index so as to compensate for chromatic aberration, and a concave lens L7 having a low dispersion and a high refractive index. The convex lens L8 and the concave lens L7 are in surface contact with each other. According to another embodiment of the present invention, the convex lens L8 may have a low dispersion and a high refractive index, while the concave lens L7 may have a high dispersion and a low refractive index.

The second lens group G2 is composed of a prism L5 and a lens L4. The lens L4 has a high dispersion and a low refractive index, and is installed opposite to the third lens group G3 so that a space, in which the prism L5 is installed behind the lens L4, is secured.

The prism L5 has an incidence surface S11 onto which the image rays projected from the first lens group G1 are incident, a reflecting surface S10 for changing the optical axis, and an exit surface S9 facing the lens L4, so that the prism L5 changes the optical axis to reduce the height H' and depth D' of the rear type liquid crystal projection display device in comparison with the conventional device. The incidence surface, reflecting surface, and exit surface of the prism L5 are all plane surfaces, and reflection angle of the prism L5 is in the range of 45° to 90°.

The third lens group G3 is installed between the second lens group G2 and the reflecting mirror 23 fixed to an upper corner portion of a case of the apparatus. The third lens group G3 is composed of first and second lenses L1 and L2 for widening the viewing angle, and a third lens L3 having an aspherical surface for compensating for flying-spot aberration and distortion aberration of the liquid crystal projection lens system. The aspherical surface of the third lens L3 is given by the following equation.

$$Z=\frac{cy^2}{1+[1-(1+k)c^2y^2]^{\frac{1}{2}}}+Ay^4+By^6+Cy^8+Dy^{10}$$

where, Z is the value of the surface sag at a distance y from the optical axis of the projection lens system, c is the curvature of the lens on the optical axis, k is a conic constant, and A, B, C and D are aspherical coefficients.

In order to secure the space for the installation of the prism L5 and to keep a long focal length, the relationship between the lens L4 of the second lens group G2 and the third lens group G3 having a negative optical power is given by $$|f_{G1}|\times 1.58 \leqq f_p$$

where, $f_{G1}$ is the focal length of the third lens group G3, and $f_p$ is the focal length of the lens L4 of the second lens group G2.

The main image rays per field are emitted almost in right angles from the image-forming element 21 in the liquid crystal projection system of the present invention, which emitted angle $Q_c$ is given by $$85° \leqq |Q_c| \leqq 95°$$

where, $Q_c$ is the angle formed between the incident angle of the image rays from the image-forming element and the optical axis of the lens system.

The specifications of the lens system according to the present invention as described above are shown in Table 1.

TABLE 1

| Lens | Surface | Surface Radius | Axial distance between surfaces | Nd | Vd |
|---|---|---|---|---|---|
| L1 | S1 | 48.17751 | 3.200000 | 1.7551 | 27.5302 |
| | S2 | 27.14986 | 7.574655 | | |
| L2 | S3 | 37.26238 | 4.160000 | 1.4920 | 57.1000 |
| | S4 | 20.99776 | 12.852060 | | |
| L3 | S5 | 365.70832 | 3.045273 | 1.7440 | 44.7200 |
| | S6 | 49.39223 | 26.672040 | | |
| L4 | S7 | 136.89548 | 8.000000 | 1.7552 | 27.5302 |
| | S8 | −85.42751 | 8.534598 | | |
| L5 | S9 | ∞ | 30.000000 | 1.6229 | 58.1223 |
| | S10 | ∞ | 30.000000 | | |
| | S11 | ∞ | 6.737756 | | |

TABLE 1-continued

| Lens | Surface | Surface Radius | Axial distance between surfaces | Nd | Vd |
|---|---|---|---|---|---|
| L6 | S12 | 207.75135 | 3.60000 | 1.6031 | 60.6946 |
| | S13 | −110.12058 | 2.121699 | | |
| L7 | S14 | 463.28994 | 1.500000 | 1.7552 | 27.5302 |
| L8 | S15 | 27.03713 | 3.200000 | 1.6385 | 55.4496 |
| | S16 | −105.3281 | 84.401920 | | |
| L9 | S17 | 72.17704 | 10.400000 | 1.6584 | 50.8546 |
| | S18 | ∞ | | | |

Aspherical Coefficients

S3

K: −0.474705
A: 0.105421E-04 B: −.1437E-07
C: 0.110722E D: −.582803E-14

S4

K: −0.542838
A: 0.117551E-04 B: −.18175E-07
C: −.314382E-11 D: −.261295E-13

Figure 5:
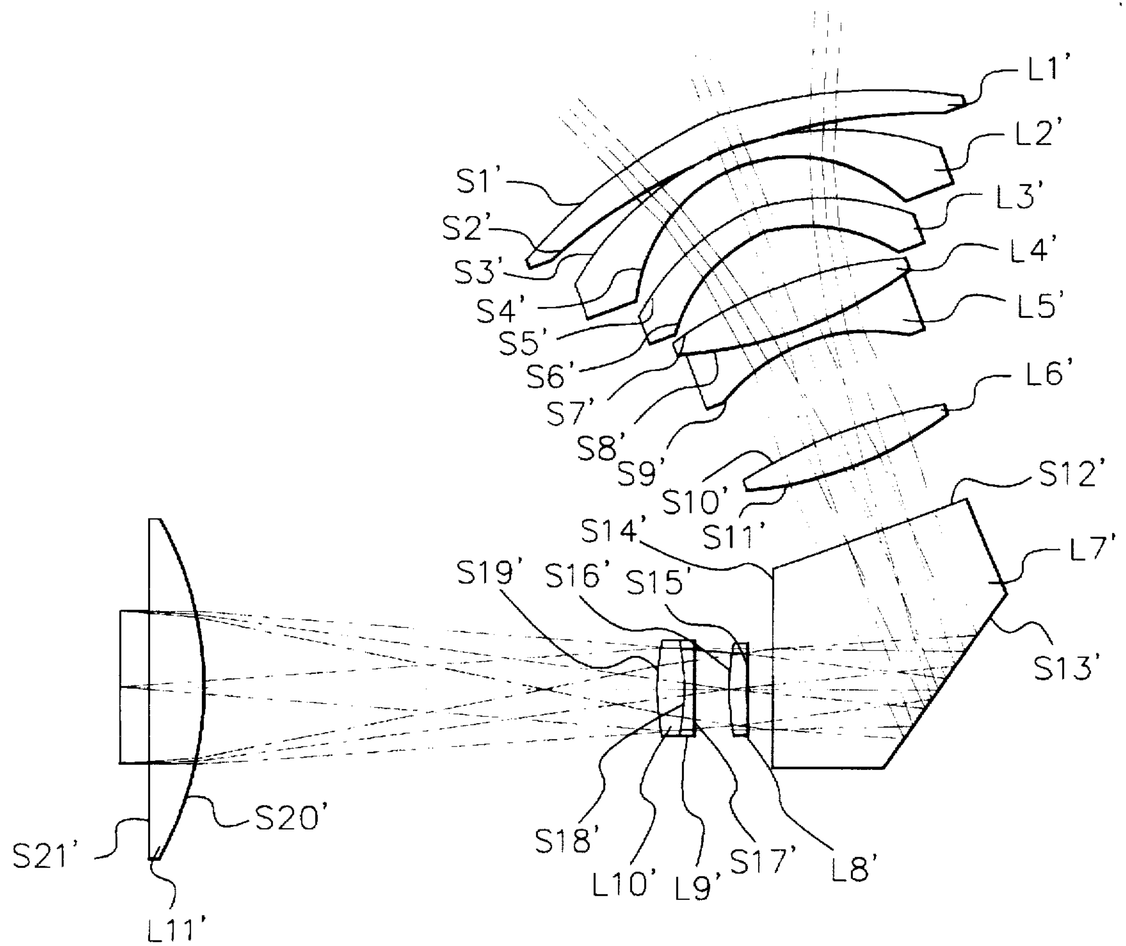
FIG. 5 is a view illustrating the arrangement of the projection lenses used in the liquid crystal projection display system according to another embodiment of the present invention.

The third lens group G3, as shown in FIG. 5, may comprise an achromatic lens in which a fourth lens L4' having a high dispersion and a low refractive index to correct chromatic aberration of the projection lens system, and a fifth lens L5' having a low dispersion and a high refractive index are in surface contact with each other. The specifications of the lens system as described above are shown in Table 2.

TABLE 2

| Lens | Surface | Surface Radius | Axial distance between surfaces | Nd | Vd |
|---|---|---|---|---|---|
| L1' | S1' | 82.10420 | 6.200000 | 1.5167 | 64.1983 |
| | S2' | 106.54108 | 0.230435 | | |
| L2' | S3 | 56.60309 | 3.200000 | 1.7858 | 43.9344 |
| | S4 | 28.43535 | 8.154609 | | |
| L3' | S5' | 46.29756 | 4.160000 | 1.4920 | 57.1000 |
| | S6' | 23.26972 | 10.235830 | | |
| L4' | S7' | 109 79187 | 8.200000 | 1.5167 | 64.1983 |
| L5' | S8' | −73.95939 | 2.630000 | 1.7440 | 44.7200 |
| | S9' | 35.84839 | 17.181070 | | |
| L6' | S10' | 165.00706 | 6.000000 | 1.7551 | 27.5302 |
| | S11' | −70.55054 | 2.727429 | | |
| L7' | S12 | ∞ | 30.000000 | 1.6385 | 55.4496 |
| | S13' | ∞ | 30.000000 | | |
| | S14 | ∞ | 4.200000 | | |
| L8' | S15 | 227.41448 | 3.6000000 | 1.7015 | 41.1490 |
| | S16 | −71.113651 | 6.0000000 | | |
| L9' | S17' | −688.35298 | 1.7550000 | 1.7551 | 27.5302 |
| L10' | S18' | 23.87369 | 4.360000 | 1.6584 | 50.8546 |
| | S19' | −86.64169 | 78.293056 | | |
| L11' | S20' | 70.15795 | 9.000000 | 1.6584 | 55.4496 |
| | S21' | ∞ | | | |

Aspherical Coefficients

S5

K: 0.005027
A: 0.101111E-04 B: −.129892E-07
C: 0.939820E-11 D: −.514403E-14

S6

K: 0.310434
A: 0.945623E-05 B: −.148386E-07
C: −.929317E-11 D: −.248500E-13

From the foregoing, it will be apparent that the present invention provides advantages in that it can minimize the height and depth of a projection display system by changing the optical axis over 90° utilizing a prism, and thus its external appearance is compact, providing convenience in installation and movement of the display system. Further according to the present invention, an image having a good contrast can be obtained.

While the present invention has been described and illustrated herein with reference to the preferred embodiments thereof, it will be understood by those skilled in the art that various changes in form and details may be made therein without departing from the spirit and scope of the invention.

What is claimed is:

1. A wide-projection angle liquid crystal projection lens system comprising:

a condensing lens, confronting to a light-emitting surface of an image-forming element for emitting image rays to be magnified and projected onto a screen of a projection display system, for converging said image rays incident into an aperture stop of said projection lens system;

a first lens group, installed opposite to a light-emitting surface of said condensing lens, for correcting chromatic aberration of said image rays converged and emitted from said condensing lens;

a second lens group for changing a direction of said image rays emitted from said first lens group; and a third lens group for magnifying said image rays emitted from said second lens group and projecting said magnified image rays to a reflecting mirror.

2. A wide-projection angle liquid crystal projection lens system as claimed in claim 1, a focal length of said condensing lens is greater than a distance between said first lens group and said condensing lens.

3. A wide-projection angle liquid crystal projection lens system as claimed in claim 2, wherein a degree of parallelism of an optical axis of said image rays effected by said condensing lens is in an allowable error range of ±5°.

4. A wide projection angle liquid crystal projection lens system as claimed in claim 1, wherein said first lens group comprises at least one achromatic lens to correct chromatic aberrations caused by said condensing lens.

5. A wide angle projection liquid crystal projection lens system as claimed in claim 4, wherein said achromatic lens is composed of a first lens and a second lens having compensable dispersion and refractive index, said first and second lens being in surface contact with each other.

6. A wide-projection angle liquid crystal projection lens system as claimed in claim 1, wherein said second lens group comprises a projection lens facing said third lens group, and a prism having an incidence surface onto which said image rays from said first lens group is incident, a reflecting surface for changing an optical axis of said image rays, and an exit surface facing said projection lens.

7. A wide-projection angle liquid crystal projection lens system as claimed in claim 6, wherein said incident surface, reflecting surface, and exit surface of said prism are plane surfaces, respectively.

8. A wide-projection angle liquid crystal projection lens system as claimed in claim 6, wherein a reflection angle of said prism is in the range of 40° to 90°.

9. A wide-projection angle liquid crystal projection lens system as claimed in claim 6, wherein a relationship between a focal length $f_P$ of said projection lens and a focal length $f_{G1}$ of said third lens group is given by $|f_{G1}|\times 1.58 \leqq f_P$.

10. A wide-projection angle liquid crystal projection lens system as claimed in claim 1, wherein said third lens group includes a plurality of lens elements, at least two of which have negative optical power.

11. A wide-projection angle liquid crystal projection lens system as claimed in claim 10, wherein at least one of said lens elements having negative optical power has an aspherical surface.

12. A wide-projection angle liquid crystal projection lens system as claimed in claim 10, wherein said third lens group further includes an achromatic lens composed of a first lens having a high dispersion and a low refractive index and a second lens having a low dispersion and a high refractive index, said first and second lenses being cemented with each other.

13. A wide-projection angle liquid crystal projection lens system as claimed in claim 1, wherein main image rays per field are emitted from said image-forming element almost in right angles, and in the range of $85° \leqq |Q_c| \leqq 95°$, where $Q_c$ is an emission angle of said image rays with respect to said image-forming element.

* * * * *